United States Patent Office 3,261,807
Patented July 19, 1966

3,261,807
ORGANOSILICON MATERIALS
Ben A. Bluestein, Schenectady, N.Y., assignor to General Electric Company, a corporation of New York
No Drawing. Filed Oct. 21, 1963, Ser. No. 317,826
10 Claims. (Cl. 260—46.5)

The present invention relates to organosilicon materials having a tert-alkoxy radical and an aryl radical attached to silicon.

The organosilicon materials of the present invention have the characteristic unit, (1) 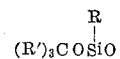

where R is selected from monovalent aryl radicals and halogenated monovalent aryl radicals, and R' is an alkyl radical having up to four carbon atoms. For example, there is included by the present invention, silanes having the formula:

(2) 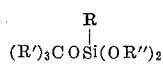

where R and R' are as defined above, and R'' is selected from hydrogen, R' and acyl. In addition, the present invention is also directed to cyclopolysiloxanes having the formula:

(3) 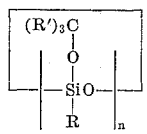

where R and R' are as defined above, and $n$ is an integer equal to from 3 to 8, inclusive.

Some of the silanes shown by Formula 2 can be made by reacting aryltrihalosilane and tert-alkyl alcohol in the presence of an acid acceptor, for example, pyridine, as shown by the following equation, (4) $$\text{RSiX}_3 + (\text{R}')_3\text{COH} \xrightarrow{\text{base}} \text{R}(\text{R}')_3\text{COSiX}_2$$

The resulting tert-alkoxyaryldihalosilane can be treated with a mixture of an alkali bicarbonate and an organic solvent, such as acetone at reduced temperatures to convert the tert-alkoxyaryldihalosilane to the corresponding tert-alkoxyarylsilanediol.

Methods also can be employed to make other tert-alkoxyarylsilanes included by Formula 2, such as the corresponding tert-alkoxyaryldialkoxysilane by reacting aryltrialkoxysilane with tert-alkyl alcohol in the presence of alkali-alkoxide catalyst, (5) $$\text{RSi}(\text{OR}'')_3 + (\text{R}')_3\text{COH} \xrightarrow{\text{base}} \text{R}(\text{R}')_3\text{COSi}(\text{OR}'')_2$$

where R, R' and R'' are as defined above, and X is a halogen radical such as chloro, bromo, etc. Silanes included by Formula 2 having acyloxy radicals attached to silicon, can be made by reacting tert-alkoxyaryldialkoxysilane with an acid anhydride such as $(\text{R}'\text{CO})_2\text{O}$. The tert-alkoxyaryldiacyloxysilane can be partially hydrolyzed to form tert-alkoxyarylacyloxysilanol.

Cyclopolysiloxanes of Formula 3 can be made in accordance with the method shown by Equation 4, by direct hydrolysis of tert-alkoxyaryldihalosilane, instead of treatment with alkali-bicarbonate and organic solvent mixture.

Included by the tert-alkoxyarylsilanes of Formula 2, are tert-butoxyarylsilanes, such as tert-butoxyphenylsilanediol, tert-butoxychlorophenylsilanediol, tert-butoxytolysilanediol, etc.; tert-butoxyphenyldiformoxysilane, tert-butoxyphenyldiacetoxysilane, etc.; tert-butoxyphenyldimethoxysilane, tert-butoxyphenyldiethoxysilane, etc. The tert-alkoxyarylsilanes of Formula 2, also include the aforementioned tert-alkoxyarylsilanes where in place of tert-butoxy, there is substituted dimethylethylmethoxy, diethylbutylmethoxy, etc.

The cyclopolysiloxanes of Formula 3, include for example, 2,4,6 - tris(tert-butoxy)2,4,6-triphenylcyclotrisiloxane, 2,4,6,8-tetrakis(tert-butoxy) 2,4,6,8-tetra-tolylcyclotetrasiloxane, 2,4,6,8,10-penta(tert-butoxy)2,4,6,8,10-pentaphenylcyclopentasiloxane; 2,4,6-tris(dimethylpropylmetoxy) 2,4,6-tritolylcyclotrisiloxane, 2,4,6,8-tetrakis(triethylmethoxy)2,4,6,8-tetraphenylcyclotetra-siloxane, etc.

There also are included by the present invention, organosilicon materials consisting essentially of chemically combined units of Formula 1, and copolymers composed of chemically combined units of Formula 1 and diorganosiloxy units of the formula, (6) $$(\text{R}''')_2\text{SiO}$$

where R''' can be an R radical and R' radical. The copolymers having units of Formulae 1 and 6, also can contain chemically combined organocyanoalkylsiloxy units.

Radicals included by R of the above formulae are, for example, phenyl, chlorophenyl, tolyl, naphthyl, chloronaphthyl, etc. Radicals included by R' are methyl, ethyl, propyl and butyl. In addition to all of the aforementioned R' radicals, R'' includes acyl radicals, such as formyl, acetyl, propionyl, etc. Radicals included by R''' are all of the aforementioned R radicals, aralkyl radicals such as phenylethyl, benzyl, etc.; aliphatic, haloaliphatic and cycloaliphatic radicals, such as alkyl, alkenyl, cycloalkyl, haloalkyl, including methyl, ethyl, vinyl, allyl, propyl, chlorobutyl, cyclohexyl, trifluoropropyl, etc.; cyanoalkyl radicals, such as cyanoethyl, cyanopropyl, cyanobutyl, etc. In the above formulae and in formulate hereinafter, where monovalent radicals attached to silicon for example, R, R', R'', R''', etc. can represent respectively more than one radical, these radicals can be all the same, or they can be different.

Polymers consisting essentially of chemically combined units of Formula 1, can be made by polymerizing cyclopolysiloxanes of Formula 3 by the employment of a polymerization catalyst such as an alkali-hydroxide. Copolymers composed of chemically combined units included by Formulae 1 and 6, can be made by equilibrating cyclopolysiloxanes of Formula 3 and cyclopolydiorganosiloxanes having the formula, (7) 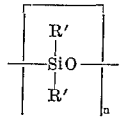

where R' and $n$ are as defined above. Polymers consisting essentially of units of Formula 1, also can be made by intercondensation of tert-alkoxyarylsilanediols included by Formula 2 by the employment of a suitable intercondensation catalyst, for example, a metal soap, such as stannous or lead octoate.

Unlike alkoxyorganopolysiloxanes of the prior art, the tert-alkoxyarylpolysiloxanes made in accordance with the present invention possess a high degree of hydrolytic stability. In addition, despite the presence of a significant proportion of monovalent aryl radicals attached to silicon by carbon-silicon linkages, polymers of the present invention can be cast into film and can be utilized in a variety of applications requiring molding or extrusion procedures. The polymers of the present invention, therefore, possess many of the advantages of organosilicon materials having aryl radicals attached to silicon by carbon-silicon linkages, such as hydrolytic stability, tensile strength, etc. However, the polymers of the present invention do not suffer from many of the disadvantages that characterize polyarylsiloxanes such as excessive crystallinity, insolubility in organic solvents, etc.

The organosilanes of Formula 2, and cyclopolysiloxanes of Formula 3, can be utilized as process aids, or plasticizers for high molecular weight organosilicon polymers. For example, tert-alkoxyarylsiloxanediol, included by Formula 2, can be employed prior to cure with organopolysiloxane compositions convertible to the elastomeric state as structure reducing additives. These organopolysiloxane compositions comprise an organopolysiloxane polymer, (8) $\quad (Z)_a SiO_{(4-a)}$ where Z is a monovalent hydrocarbon radical, halogenated monovalent hydrocarbon radical, and cyanoalkyl radical, and $a$ has a value equal to 1.98 to 2.01. These organopolysiloxane compositions are described on page 95 of "Silicones" by R. N. Meals and F. M. Lewis, Rheinhold Publishing Co., New York (1959). In addition, phenylsilsesquioxanes, such as shown in Brown et al., Patent 3,017,386, assigned to the same assignee as the present invention, can be plasticized with cyclopolysiloxanes of Formula 3.

In the practice of the invention, aryltrihalosilane is reacted with tert-alkyl alcohol in the presence of an acid acceptor such as pyridine, quinoline, dimethyl aniline, etc. Preferably, the reaction is performed at temperatures between about 0° C. to about 10° C. However, higher or lower temperatures can be employed, if desired. Equimolar amounts of aryltrihalosilane and tert-alkoxy alcohol are utilized; in particular situations, the employment of small molar excesses of either reactant can be tolerated without adverse results. The mixture is then filtered to provide for the separation of the product from acid acceptor salt.

In forming tert-alkoxyarylsilanediol, tert-alkoxyaryldihalosilanes are reacted with a mixture of alkali salt of carbonic acid such as sodium bicarbonate, and an organic solvent, preferably acetone. Hydrocarbon solvents for example, benzene, toluene, etc. also can be used if desired. During the reaction, the mixture is agitated and preferably maintained at a temperature of between 0 to 10° C. The product then can be recovered by conventional filtration and stripping procedures. Cyclization is favored if the tert-alkoxyaryldihalosilane is hydrolyzed, preferably with ice. Recovery of the product can be achieved by the employment of an organic solvent in accordance with conventional separation procedures.

In preparing silanes shown by Formula 2, substituted with alkoxy radicals, acyloxy radicals, or a mixture thereof, it has been found effective to react tert-alkyl alcohol with the appropriate aryltrialkoxysilane. The reaction is preferably performed in the presence of an alkalialkoxide catalyst such as sodium methoxide, potassium ethoxide, etc. Alcohol formed during the reaction can be removed by stripping as the reaction progresses. The corresponding tert-alkoxyarylsilane substituted with acyloxy radicals can be obtained by reacting the corresponding tert-alkoxyaryldialkoxysilane with an appropriate anhydride of the desired carboxylic acid. It has been found advantageous to employ as a catalyst an alkali carboxylate salt, preferably having the same carboxylate radical as the anhydride utilized. Hydrolysis of the tert-alkoxyaryldiacyloxysilane has been found to result in the formation of the corresponding tert-alkoxyarylacyloxysilane.

In order that those skilled in the art will be better able to practice the present invention, the following examples are given by way of illustration and not by way of limitation. All parts are by weight.

Example 1

A hexane solution of tert-butyl alcohol was added to a rapidly stirred mixture of phenyltrichlorosilane and dry pyridine dissolved in hexane. There was utilized per mole of phenyltrichlorosilane, 1.08 moles of tert-butyl alcohol and 1.2 moles of pyridine. The addition lasted about 1½ hours and the temperature was maintained at about 5° C. The mixture was then filtered to remove precipitated pyridine hydrochloride. The filtrate was added to a rapidly stirred mixture of sodium bicarbonate and acetone while the temperature was maintained between 0 and 4° C. There were employed about five moles of sodium bicarbonate, per mole of tert-butoxyphenyldichlorosilane estimated in the filtrate, and about three moles of acetone per mole of sodium bicarbonate. The mixture was stirred an additional 2 hours, filtered, and the hexane evaporated by means of a flash evaporator. A 19% yield of tert-butoxyphenylsilanediol was obtained based on the weight of starting reactants. The product was recrystallized from a benzene-hexane mixture. The crystalline solid had a melting point of 96° C.; its infrared spectrum was consistent with the structure of tert-butoxyphenylsilanediol. The identity of the product was confirmed when analyzed for OH in $C_{10}H_{16}O_3Si$; calcd.: 16.1% OH; found: 17.0% OH.

A mixture of 12 parts of a polydimethylsiloxane gum and 12 parts of the above tert-butoxyphenylsilanediol was milled with a mixture of 300 parts of a polydimethylsiloxane polymer consisting of a major amount of chemically combined dimethylsiloxy units and a minor amount of methylvinylsiloxy units and having a viscosity of about 20 million centipoises at 25° C., 186 parts of fumed silica filler, and 2.7 parts of titanium oxide. While the resulting mixture was milled, there were added 6.6 parts of dicumyl peroxide. The resulting milled mixture was then formed into a sheet from which test slabs were cut. These slabs were cured for 24 hours at 300° F. and post-cured for 96 hours at 480° F. A portion of the uncured milled composition was also tested for structure after 3 days, and 7 days, by measuring its knit-time.

The table below shows the results obtained with the composition containing tert-butoxyphenylsilanediol as a process aid as compared to the same composition free of process aid. In the table "H" is hardness (Shore A), "T" is tensile (p.s.i.), and "E" is elongation (percent). Knit-time is measured in seconds, and the procedure employed is described in Lichtenwalner, Patent 3,004,859 assigned to the same assignee as the present invention.

TABLE I

| Tert-butoxy-phenylsilanediol | 24 Hrs./300° F. | | | 96 Hrs./480° F. | | | Knit-Time | |
|---|---|---|---|---|---|---|---|---|
|  | H | T | E | H | T | E | 3 Days | 7 Days |
| Yes | 63 | 1,120 | 310 | 71 | 835 | 180 | 10 | 25 |
| No | 63 | 1,095 | 240 | 68 | 765 | 160 | 44 | 90 |

A proportion of 1 part to as high as 100 parts of tert-butoxyphenylsilanediol per 100 parts of the polydimethylsiloxane polymer also is found to improve knit-time in organopolysiloxane compositions made by the above procedure.

Example 2

An equal molar mixture of trimethoxyphenylsilane and tert-butyl alcohol was heated to reflux in the presence of about 0.2% by weight of the mixture of sodium methoxide. The methanol formed during the reaction was removed by distillation. Dry Ice was added to the reaction mixture to decompose the catalyst. The mixture then was distilled and further fractionated. There was obtained a 49% yield of product; B.P. 118–126 (20 mm.); $n_D^{20}$ 1.462–1.464. Its infrared spectrum was consistent with structure for tert-butoxyphenyldimethoxysilane.

Example 3

A mixture of tert-butoxyphenyldimethoxysilane, and acetic anhydride in which acetic anhydride was utilized at twice the moles of tert-butoxyphenyldimethoxysilane, and 1.1% by weight of the mixture of sodium acetate, was heated to a temperature between 150° C. and 170° C. for several hours. A high boiling residue was obtained;

its infrared spectrum was consistent with the structure for tert-butoxyphenyldiacetoxysilane.

Example 4

Tert-butoxyphenyldiacetoxysilane was added to a stirred solution of 10 parts of sodium bicarbonate in 30 parts of water. After ½ hour of stirring an oil was extracted with ethylacetate. The solution was washed and the solvent flashed off by evaporation. There was obtained a clear viscous liquid. Its infrared spectrum was consistent with the structure of tert-butoxyphenylacetoxysilanol. Its identity was further confirmed by elemental analysis for OH in $C_{12}H_{18}O_4Si$; calcd.: 6.7% OH; found: 6.2% OH.

Example 5

A solution of phenyltrichlorosilane in pyridine was cooled to about 10° C. using an ice bath. To the stirred solution, there was added an equal molar amount of tert-butyl alcohol over a period of ½ hour. An excess of ice was slowly added to the mixture with stirring. A heavy oil was produced which was washed with water several times; it was dissolved in hexane to separate it from the aqueous layer. The hexane was stripped from the solution at room temperature producing an oily crystalline product. The oil was dissolved in ethanol and precipitated from solution by addition of water; it crystallized on standing. Ten parts of crude product was recrystallized with methanol. A 65% yield of product was obtained having a melting point of 85° C. to 87° C. The infrared spectrum of the product was consistent with the structure for 2,4,6-tris(tert-butoxy), 2,4,6-triphenylcyclotrisiloxane.

A casting solution having 6% solids is made from a polyphenylsilsesquioxane and the above 2,4,6-tris(tert-butoxy), 2,4,6-triphenylcyclotrisiloxane as a plasticizer utilizing chlorobenzene as a solvent. The polyphenylsilsesquioxane is prepared in accordance with the procedure of Example 1 of Brown et al., Patent 3,017,386. Films are formed from casting solutions containing the phenylpolyphenylsilsesquioxane free of plasticizer, a mixture of 5 parts of the polyphenylsilsesquioxane and 1 part of plasticizer, and a mixture of 2 parts of polylphenylsilsesquioxane and 1 part of the plasticizer. The table below shows the results obtained where "T" and "E" are as defined in Table I above, "plasticizer" is 2,4,6-tris(tert-butoxy), 2,4,6-triphenylcyclotrisiloxane, and "Wt. percent" is based on the weight of solids in casting solution.

TABLE II

| Plasticizer (Wt. Percent) | T | E |
|---|---|---|
| 0 | 4,330 | 5 |
| 16 | 4,020 | 13 |
| 33 | 3,040 | 24 |

The improved film elongation shows that 2,4,6-tris(tert-butoxy), 2,4,6-triphenylcyclotrisiloxane is a valuable plasticizer.

Example 6

There was added to 10 parts of molten 2,4,6-tris(tert-butoxy),2,4,6-triphenylcyclotrisiloxane at a temperature between 90° C. to 100° C. under mild vacuum, .05 part of a 0.9% suspension of potassium hydroxide in octamethylcyclotetrasiloxane. After 7 minutes, an increase in the viscosity of the mixture was noted. After 45 minutes, the mixture was too viscous to stir. The mixture was kept in a bath at a temperature between 100° C. to 120° C. for an additional 18 hours. After the mixture had been allowed to cool, a hard solid was obtained. Methanol was added to a benzene solution of the solid to effect precipitation. It was reprecipitated with benzene and methanol; it was allowed to dry in an oven at 105° C. for 2 hours. There was obtained 8 parts of a waxy opaque white polymer. Its infrared spectrum showed the presence of chemically combined tert-butoxyphenylsiloxy units. The polymer softened at about 320° C. to 370° C. A film of the polymer was cast from a 20% chloroform solution using a standard tin tray. A copper conductor is dipped into a 20% chloroform solution of the polymer and allowed to dry in the air. It is found that the polymer imparts valuable insulating properties to the surface of the copper conductor treated with the polymer.

Example 7

There is added .05 part of the potassium hydroxide suspension utilized in Example 6, to a mixture of 5 parts of 2,4,6-tris(tert-butoxy), 2,4,6-triphenylcyclotrisiloxane and 5 parts of octamethylcyclotetrasiloxane at a temperature of about 100° C. under mild vacuum. The mixture is then heated with stirring to a temperature of between 150° C. to 175° C., for several hours. There is obtained a flexible, rubbery product. Infrared shows that the product is composed of chemically combined dimethylsiloxy units and tert-butoxyphenylsiloxane units.

The copolymer is heated to a temperature of 100° C. and then extruded onto a copper conductor. It is found that the copolymer serves as a valuable insulating material for copper wire.

While the foregoing examples have been limited to only a few of the very many variables within the scope of the present invention, it should be understood that the present invention is directed to the production of a much broader class of organosilicon materials as shown by Formulae 2 and 3. In addition to the silanes and cyclopolysiloxanes having tert-alkoxy and aryl radicals attached to silicon, it is to be understood that the present invention is directed to a variety of polymers consisting essentially of chemically combined units of Formula 1, and copolymers consisting essentially of chemically combined units of Formulae 1 and 4. All of the aforementioned organosilicon materials can be made by methods specifically described in the foregoing description.

What I claim as new and desire to secure by Letters Patent of the United States is:

1. Organosilicon materials selected from the class consisting of,
   (a) silanes having the formula,

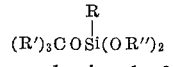

(b) cyclopolysiloxanes having the formula,

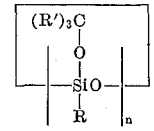

and (c) polyorganosiloxane polymers comprising chemically combined units of the formula,

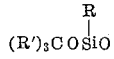

where R is a member selected from the class consisting of monovalent aryl radicals and halogenated monovalent aryl radicals, R' is an alkyl radical having up to four carbon atoms, and R'' is a member selected from the class consisting of hydrogen, an R' radical, and an acyl radical, and $n$ is an integer equal to from 3 to 8, inclusive.

2. Polyorganosiloxanes in accordance with claim 1, selected from the class consisting of,
   (a) polymers consisting essentially of chemically combined tert-alkoxyarylsiloxy units having the formula,

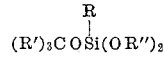

(b) copolymers consisting essentially of said tert-alkoxyarylsiloxy units and diorganosiloxy units of the formula, $(R''')_2SiO$ where R is a member selected from the class consisting of monovalent aryl radicals, and halogenated monovalent aryl radicals, R' is an alkyl radical having up to four carbon atoms, R''' is a member selected from the class consisting of R, R', alkenyl and cyanoalkyl radicals.

3. Silanes having the formula,

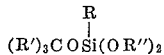

where R is selected from the class consisting of monovalent aryl radicals and halogenated monovalent aryl radicals, R' is a lower alkyl radical having up to four carbon atoms and R'' is selected from the class consisting of hydrogen, R' and acyl.

4. Cyclopolysiloxanes having the formula,

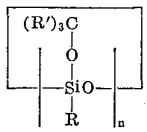

where R is a member selected from the class consisting of monovalent aryl radicals and halogenated monovalent aryl radicals, R' is an alkyl radical having up to four carbon atoms and $n$ is an integer equal to from 3 to 8, inclusive.

5. Tert-butoxyphenylsilanediol.
6. Tert-butoxyphenyldiacetoxysilane.
7. Tert-butoxyphenyldimethoxysilane.
8. 2,4,6 - tris(tert-butoxy),2,4,6-triphenylcyclotrisiloxane.
9. A polymer consisting essentially of chemically combined tert-butoxyphenylsiloxy units.
10. A copolymer consisting essentially of chemically combined tert-butoxyphenylsiloxy units and dimethylsiloxy units.

References Cited by the Examiner
UNITED STATES PATENTS

| 2,521,673 | 9/1951 | Britton et al. | 260—46.5 |
| 2,566,364 | 9/1951 | Pedlow et al. | 260—46.5 |
| 2,624,749 | 1/1953 | Bunnell | 260—46.5 |

LEON J. BERCOVITZ, *Primary Examiner.*

M. I. MARQUIS, *Assistant Examiner.*